US008145515B2

(12) United States Patent
Whitsitt et al.

(10) Patent No.: US 8,145,515 B2
(45) Date of Patent: Mar. 27, 2012

(54) ON-DEMAND PERFORMANCE REPORTS

(75) Inventors: Michael S. Whitsitt, Lakeville, MN (US); Stephanie W. Lund, Minneapolis, MN (US); Lucas W. Van Epern, Crystal, MN (US); Eric P. Busch, St. Louis Park, MN (US); Donald L. Sawyer, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 255 days.

(21) Appl. No.: 12/467,488

(22) Filed: May 18, 2009

(65) Prior Publication Data

US 2010/0293039 A1   Nov. 18, 2010

(51) Int. Cl.
*G06Q 10/00* (2012.01)

(52) U.S. Cl. .............. 705/7.11; 705/7.42; 705/7.38; 705/7.12; 705/7.27; 705/21

(58) Field of Classification Search .......... 705/11, 705/12, 14, 38, 41, 42
See application file for complete search history.

(56) References Cited

U.S. PATENT DOCUMENTS

| | | | |
|---|---|---|---|
| 4,978,305 A | 12/1990 | Kraft | |
| 5,212,635 A * | 5/1993 | Ferriter | 705/7.42 |
| 5,326,270 A | 7/1994 | Ostby et al. | |
| 5,390,107 A * | 2/1995 | Nelson et al. | 705/7.13 |
| 5,500,795 A * | 3/1996 | Powers et al. | 705/7.38 |
| 5,557,513 A | 9/1996 | Frey et al. | |
| 5,799,286 A | 8/1998 | Morgan et al. | |
| 5,847,971 A | 12/1998 | Ladner et al. | |
| 5,900,801 A | 5/1999 | Heagle et al. | |
| 5,939,974 A | 8/1999 | Heagle et al. | |
| 6,119,097 A | 9/2000 | Ibarra | |
| 6,122,559 A | 9/2000 | Bohn | |
| 6,192,400 B1 | 2/2001 | Hanson et al. | |
| 6,275,812 B1 | 8/2001 | Haq et al. | |
| 6,349,327 B1 | 2/2002 | Tang et al. | |
| 6,401,072 B1 | 6/2002 | Haudenschild et al. | |
| 6,750,766 B1 | 6/2004 | Heitner et al. | |

(Continued)

FOREIGN PATENT DOCUMENTS

JP    10263132 A    10/1998

(Continued)

OTHER PUBLICATIONS

"Fair Isaac Improves Blaze Advisor Rules Management with New Features for Score Model Creation and Execution, Business Wire", Jun. 7, 2004, pp. 1-3, http://findarticles.com/p/articles/mi_m0EIN/is_2004_June_7/ai_n6056939/ print (last visited Apr. 22, 2008).

(Continued)

*Primary Examiner* — Matthew Gart
*Assistant Examiner* — Michael Maicher
(74) *Attorney, Agent, or Firm* — Nixon & Vanderhye P.C.

(57) ABSTRACT

A method is provided for rendering performance reports on a client device in a retail establishment. A request is received to render a summary performance report on the client device. Shift information for the user is retrieved. At least one summarized performance metric is obtained from one of a plurality of business data statistics providers using the shift information. Scoring rules are applied to the at least one obtained summarized performance metric. The at least one summarized performance metric and corresponding score associated with the at least one summarized performance metric are compiled into the summary performance report. The summary performance report is sent to the client device for rendering.

9 Claims, 7 Drawing Sheets

U.S. PATENT DOCUMENTS

| | | |
|---|---|---|
| 6,838,977 B2 | 1/2005 | Chen et al. |
| 6,921,266 B2 | 7/2005 | Kon |
| 6,922,133 B2 | 7/2005 | Wolfe |
| 6,976,002 B1 | 12/2005 | Ferguson et al. |
| 7,033,180 B2 | 4/2006 | Fujita |
| 7,122,944 B2 | 10/2006 | Grimshaw |
| 7,195,489 B2 | 3/2007 | Fujita |
| 7,671,728 B2 | 3/2010 | Buehler |
| 2002/0019765 A1 | 2/2002 | Mann et al. |
| 2002/0019766 A1 | 2/2002 | Higashi et al. |
| 2002/0077884 A1 | 6/2002 | Sketch |
| 2002/0120493 A1 | 8/2002 | Mormile |
| 2003/0135406 A1* | 7/2003 | Rowe ............... 705/11 |
| 2003/0225589 A1 | 12/2003 | Eaton et al. |
| 2004/0059790 A1 | 3/2004 | Austin-Lane et al. |
| 2004/0093263 A1 | 5/2004 | Doraisamy et al. |
| 2004/0128353 A1 | 7/2004 | Goodman et al. |
| 2004/0176107 A1 | 9/2004 | Chadha |
| 2005/0048451 A1 | 3/2005 | Fujita |
| 2005/0108074 A1 | 5/2005 | Bloechl et al. |
| 2005/0182761 A1 | 8/2005 | Kato |
| 2005/0216331 A1* | 9/2005 | Ahrens et al. ............. 705/11 |
| 2006/0020942 A1 | 1/2006 | Ly et al. |
| 2006/0087411 A1 | 4/2006 | Chang |
| 2007/0100677 A1* | 5/2007 | Boss et al. ............... 705/9 |
| 2007/0152810 A1 | 7/2007 | Livingston et al. |
| 2007/0279214 A1 | 12/2007 | Buehler |

FOREIGN PATENT DOCUMENTS

| | | |
|---|---|---|
| JP | 11334254 A | 12/1999 |
| JP | 2003-233701 | 8/2003 |
| JP | 2004-247966 | 9/2004 |
| JP | 2004-303033 | 10/2004 |
| JP | 2005-100087 | 4/2005 |
| JP | 2006-031712 | 2/2006 |
| JP | 2006-129385 | 5/2006 |
| JP | 2006-344191 | 12/2006 |

OTHER PUBLICATIONS

"The Avalon project at Yale Law School", Nov. 19, 2001, pp. 1-64, http://www.yale.edu/lawweb/avalon/sept_11/s1447_enr.htm (last visited Dec. 26, 2007).

Proven Software Solution launches the Element Control Software Platform for Managing network elements; Mar. 28, 2008, Newswire, pp. 1-3.

POS Page keeps staff in touch, Jan. 10, 2008, In Store Marketing, pp. 1-2.

* cited by examiner

800

My prog>Cashier Speed Score
Speed ▲▼
GSTL: Nicole B

| Cashier | Speed % | Score |
|---|---|---|
| 860 Juli Bro | 91% | G |
| 866 Laura Smi | 85% | Y |
| 862 Nelia Was | 89% | G |
| 868 Rob Nic | 82% | Y |
| 864 Wesley Tho | 80% | G |

My progress>Alert Performance

| Alert Type | # of Alerts | Avg. Resp | Score |
|---|---|---|---|
|  | 19 | 00:49 | G — 960, 962 |
|  | 13 | 00:42 | G |
|  | 4 | 00:65 | Y — 964 |
|  | 6 | 01:02 | — 966 |
|  | 3 | 02:49 | — 968 |

My progress>Prompt Credit
Name ▲▼
GSTL: Nicole B

| Cashier | Prompted Apps/prompts | Prompted Conv. % | |
|---|---|---|---|
| 1060 Aydan Rat | 1/80 | 1.2% | G |
| 1064 Carlie Lan | 1/86 | 1.16% | Y |
| 1062 Makeo Pyg | 1/65 | 1.54% | G |
| 1066 Nelia Bul | 0/174 | 0% | R |

My progress>Checkcard
Name ▲▼
GSTL: Nicole B

| Cashier | Prompted Apps/prompts | Prompted Conv. % | |
|---|---|---|---|
| 1160 Anne Lar | 1/80 | 1.2% | G |
| 1164 Chelsey Bro | 1/86 | 1.16% | Y |
| 1162 Makeo Pyg | 1/65 | 1.54% | G |
| 1166 Melody Car | 0/174 | 0% | R |

FIG. 11

| Cashier | # of S's | Score |
|---|---|---|
| Joshua And | 1 | G |
| Julie Bro | 5 | Y |
| Cheryl Han | 2 | G |
| Steve Cor | 9 | R |
| Tye Bil | 2 | G |

FIG. 12

ON-DEMAND PERFORMANCE REPORTS

BACKGROUND

In many retail stores, customers shop for products and then bring their selections to a point-of-sale register, where the prices of the products are tallied and the customers pay for their purchases through a process known as "check-out." The competency and speed with which customers' purchases are processed at a check-out is a major component of the overall shopping experience. As such, retailers desire a high quality check-out process to proceed as efficiently as possible.

Check-out registers are operated by employees under the direction of a manager or other employee. In small retail stores, the manager is usually close to the register and can work closely with the employee responsible for it. However, in larger retail stores where there are multiple registers spread across an area of the store, the manager may not be close enough to gauge the performance of every employee.

The discussion above is merely provided for general background information and is not intended to be used as an aid in determining the scope of the claimed subject matter.

SUMMARY

A method is provided for rendering performance reports on a client device in a retail establishment. A request is received to render a summary performance report on the client device. Shift information for the user of the client device is retrieved. At least one summarized performance metric is obtained from one of a plurality of business data statistics providers using the shift information. For example, a statistics provider can be configured to statistically aggregate point-of-sale transaction data. Scoring rules are applied to the at least one obtained summarized performance metric. The at least one summarized performance metric and any corresponding score associated with the at least one summarized performance metric are compiled into the summary performance report. The summary performance report is sent to the client device for rendering.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 8 is a screenshot illustrating an exemplary detailed performance report for cashier speed.

FIG. 9 is a screenshot illustrating an exemplary detailed performance report for alert performance.

FIG. 10 is a screenshot illustrating an exemplary detailed performance report for credit conversion rate.

FIG. 11 is a screenshot illustrating an exemplary detailed performance report for debit conversion rate.

FIG. 12 is a screenshot illustrating an exemplary detailed performance report for cashier suspend and retrieves.

DETAILED DESCRIPTION

Embodiments described herein include methods of presenting real-time performance reports to an employee in a retail establishment. Performance reports can be summary-type performance reports including summarized performance metrics based on both individual-type responsibilities of the employee, or in the case where the employee is a manager, responsibilities of the employees whom the manager is managing. Performance reports can also be detail-type performance reports including detailed performance metrics based on both individual-type responsibilities and responsibilities of the employees whom the manager is managing. A performance report is presented to an employee on demand. To render the performance report, a performance reporting system obtains performance metrics from statistics providers that evaluate statistical data from databases of business data. Scoring rules are applied to the obtained performance metrics. The scores and performance metrics are compiled and sent to a client device under control of the employee for rendering.

Figure 1:
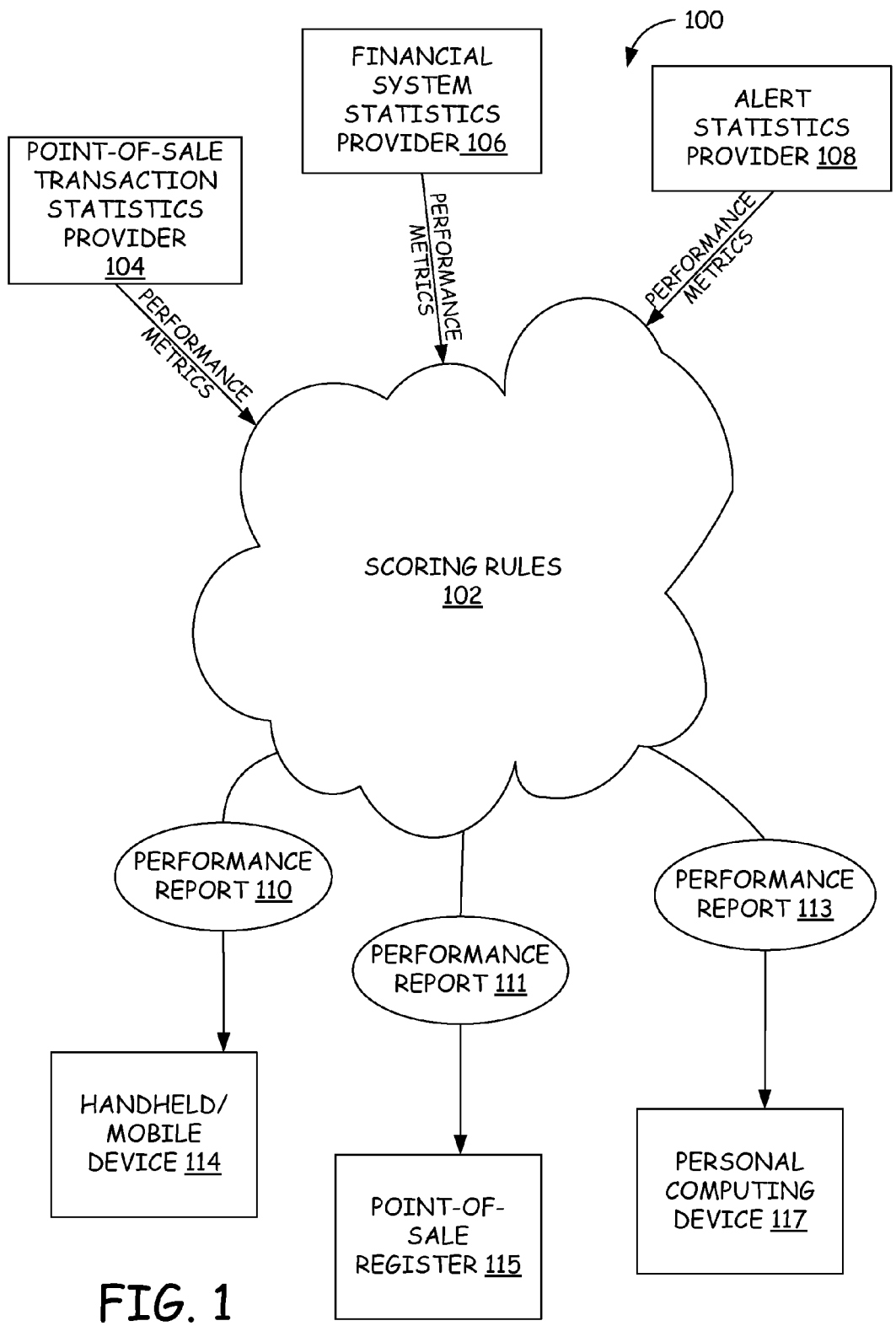
FIG. 1 illustrates a simplified block diagram of a performance reporting system under one embodiment.
Figure 2:
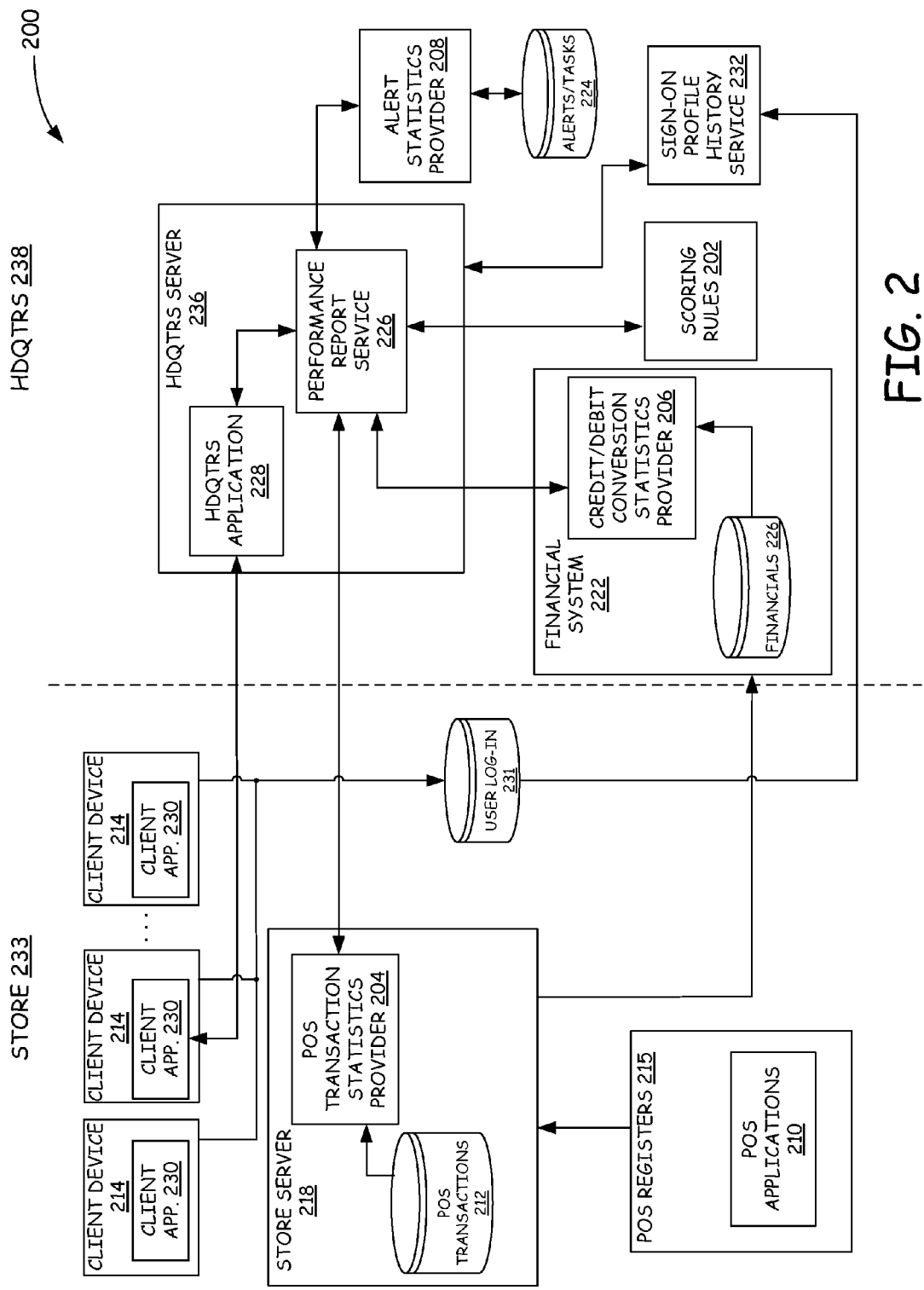
FIG. 2 illustrates a detailed block diagram of a performance reporting system under another embodiment.

FIG. 1 is a simplified block diagram of a performance reporting system 100 in accordance with one embodiment. FIG. 2 is a detailed block diagram of a performance reporting system 200 in accordance with another embodiment. Performance reporting systems 100 and 200 are for use in a suitable computing system environment. Examples of well known computing systems, environments, and/or configurations that are suitable for use with elements of performance reporting systems 100 and 200 include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of performance reporting systems 100 and 200 are described below in the general context of computer-executable instructions, such as program modules, being executed by a processor in one or more of the devices listed above and being stored on a computer-readable media such as a disc drive or solid state memory, for example. Generally, program modules include routines, programs, objects, components, data structures, etc. that perform particular duties or implement particular abstract data types. Some embodiments are designed to be practiced in distributed computing environments where tasks are performed by remote processing devices that are linked through a communications network. In a distributed computing environment, program modules are located in both local and remote computer storage media (or computer-readable media) including memory storage devices.

In FIG. 1, performance reporting system 100 is shown to include a plurality of different statistics providers 104, 106 and 108 that evaluate business data in terms of employee responsibilities and conduct and that produce performance metrics based on those responsibilities and conduct. As illustrated in FIG. 1, performance metrics can be obtained from a variety of different types of statistics providers. For example, point-of-sale transaction statistics provider 104 evaluates transaction data from point-of-sale applications on point-of-sale registers, credit/debit conversion statistics provider 106 evaluates how many prompts a employee is given to ask if the guest would like to open a credit or debit account and how many times the guest accepts and an alert statistics provider 108 evaluates task data for tasks assigned to an employee. Although FIG. 1 illustrates three example providers of performance metrics, it should be realized that other statistics providers for other types of business data can also be used.

To render on-demand performance reports, the performance metrics are applied against a set of scoring rules 102. As illustrated in FIG. 1, scoring rules 102 are applied to the performance metrics obtained from the statistic providers 104, 106 and 108. After scoring, performance reports 110, 111 and 113 are sent out to the requesting client device, such as client devices 114, 115 and 117. Such performance reports include information, such as specific performance metrics and scores corresponding to the performance metrics.

Similar to FIG. 1, performance reporting system 200, illustrated in FIG. 2, includes business data statistics providers. For example, performance reporting system 200 includes POS transaction statistics provider 204, credit/debit conversion statistics provider 206 and alert statistics provider 208.

Point-of-sale applications generally run on point-of-sale registers and are used by cashiers to process transactions related to purchasing merchandise and/or returning merchandise. Point-of-sale registers usually include a cash drawer for storing currency and checks, a credit card reader to process transactions tendered by credit card, a barcode scanner to scan price tags on items for item price look up and a receipt printer. Point-of-sale registers can provide real-time sales transaction data and historical process transaction data. Examples of real-time sales transaction data include data related to items purchased such as item description and price, discounts applied by the cashier and how the transaction was tendered. Historical process transaction data is data related to the history of sales transactions that are being processed such as the number of discounts the cashier has entered, the number of times the cashier has keyed in a price instead of scanning a tag, and the number of times the cashier has suspended a transaction and then retrieved the suspended transaction.

As illustrated in FIG. 2 and under embodiments described herein, point-of-sale (POS) transaction data from point-of-sale applications 210 on point-of-sale registers 215 are stored in an in-store POS transaction database 212 on a store server 218 in a store 233. A point-of-sale transaction statistics provider 204 accesses POS transaction database 212 and is capable of statistically evaluating and/or aggregating point-of-sale transaction data in database 212 to form and provide various performance metrics. For example, POS transaction statistics provider 204 can provide performance metrics related to a cashier speed metric or cashier initiation of suspended and retrieved transaction metric. Cashier speed is determined by how fast it takes cashier(s) to ring a transaction. Suspended and retrieved transactions are those transactions where a cashier suspends the transaction before it can be tendered and retrieves the transaction such that it can be tendered and completed. While suspended and retrieved transactions may be utilized for any number of reasons, suspended and retrieved transactions can be indicative of a cashier controlling the time it takes them to ring a transaction such that their cashier speed improves. A cashier performing many suspended and retrieved transactions can indicate inaccurate cashier speed.

A retail establishment can have its own financial system 222 located at store headquarters 238 that manages the issuance of credit or debit to customers of the store in the form of credit card accounts and in the form of debit card accounts that are linked to a guest's bank-affiliated checking account. The financial system 222 and other components illustrated at headquarters 238 may be distributed across several different servers in several different structures referred to collectively as headquarters 238.

Employees are prompted to offer these types of account services to customers based on data entered during a transaction being processed by a POS register. At the end of a transaction, if prompted, the employee offers these credit/debit account services to a guest for tendering the purchases being made in the transaction. The conversion of a prompt to an application for, issuance of or opening and/or tendering of purchases from store credit or debit are stored as financial data in a financials database 226 in financial system 222 located at store headquarters 238. A credit/debit conversion statistics provider 206 accesses financials database 226 and is capable of statistically evaluating and aggregating financial data such as credit/debit conversion data, to form and provide various performance metrics. For example, credit/debit conversion statistics provider 206 can provide performance metrics related to a credit/debit conversion metric.

A retail establishment can also have an alert system. An alert system can identify in-store information that is of interest and alert specific people, such as employees and managers, to this information such that they can take action to address it. Specific in-store information is presented to employees or managers in the form of a task that needs to be performed. Tasks are activated and stored in a tasks database 224 if such a task is not a duplicate of other pending tasks. After the task is activated, an alert is sent to an employee responsible for the task. The alert indicates to the employee that they have been assigned the task. An alert statistics provider 208 accesses task database 224 and is capable of statistically evaluating and aggregating task statistics to form and provide various performance metrics. For example, alert statistics provider 208 can provide performance metrics related to the amount of alerts given to an employee in a certain hierarchy of priority and the response time for completing the tasks the employee was alerted to.

Performance reporting system 200 also includes a plurality of client devices 214. Each client device 214 includes a client application 230. A user can log-in to one of the plurality of client devices 214 such that the user is able to request and receive performance reports for a given shift. Upon log-in, a user ID, a role and a date and time of the user's shift is stored in user log-in database 231. Based on log-in information, database 231 can store business areas of store 233 that the user is covering. In addition, the client device creates a user profile in the form of a data packet, which can be sent to headquarters 238 for use when requesting performance reports. This user profile packet of information can include store information, user ID, role and shift date and time. Example client devices 214 can include handheld or mobile devices, personal computing devices and point-of-sale registers as illustrated in FIG. 1.

In one embodiment, a user will log-in to an appropriate client device 214 as a select user role or as a position of a select business area or business section in the store 233. However, the user also can log-in to the appropriate client device as a plurality of different user roles and/or choose to receive performance reports for a plurality of different business areas. For example, the user can log-in to the client device 214 in a guest services manager role and can select or be assigned one area of the store where point-of-sale registers are located or can select or be assigned to more than one business area of the store where point-of-sale registers are located. This ability to select or be assigned to more than one business area to receive performance reports allows a single user or employee to cover more business areas if there are no other available users or employees in the store to cover those areas. In addition, it allows multiple users to receive the same performance reports.

Performance report service 226 located on headquarters server 236 at headquarters 238 obtains performance metrics from providers 204, 206 and 208 and applies scoring rules 202 to the performance metrics obtained. Performance report service 226 compiles the performance metrics and any corresponding scores associated with the performance metrics and sends the compiled information to the client device 214 as a performance report.

Figure 3:
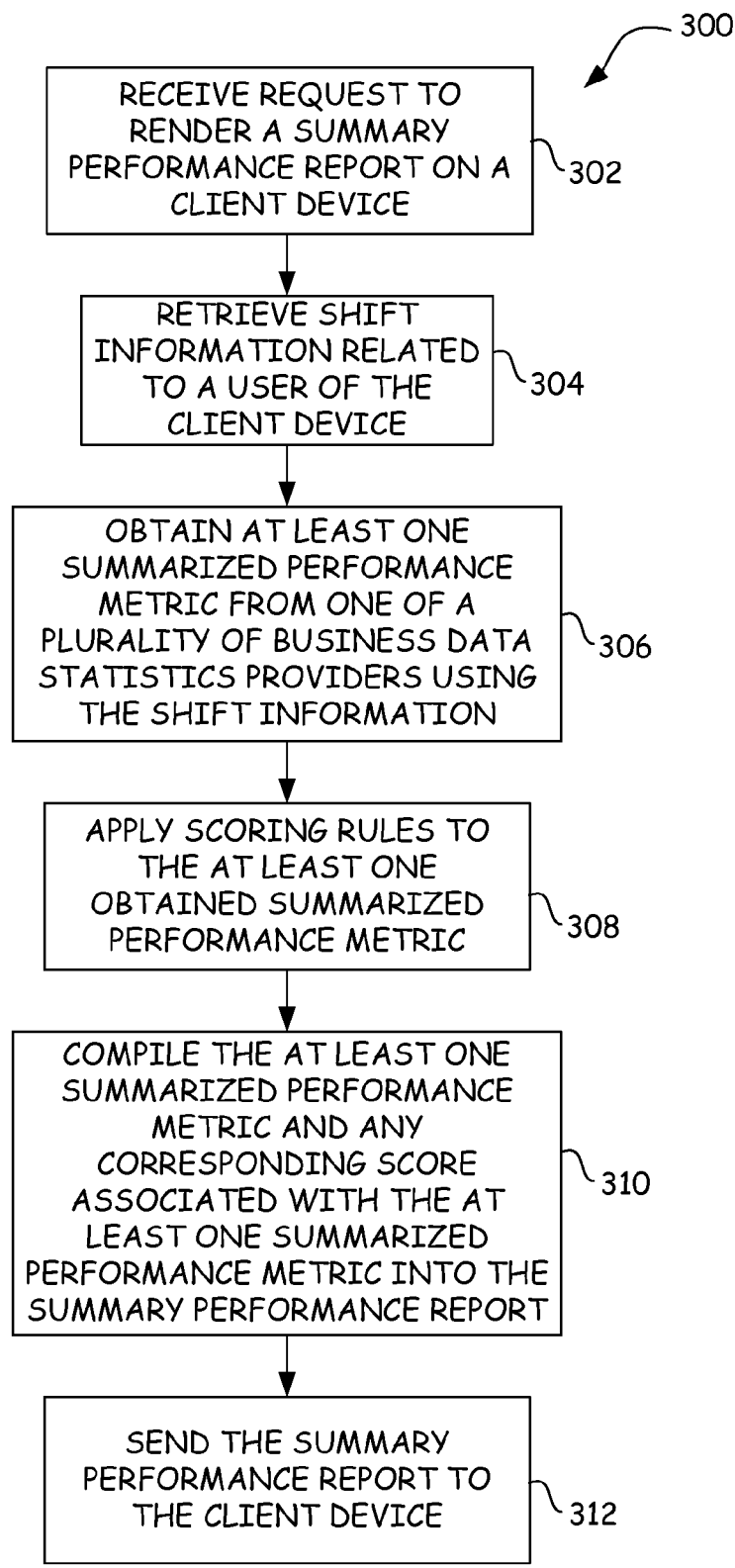
FIG. 3 is a flow diagram illustrating a method of using the performance reporting system illustrated in FIG. 2 to render a summary performance report.
Figure 4:
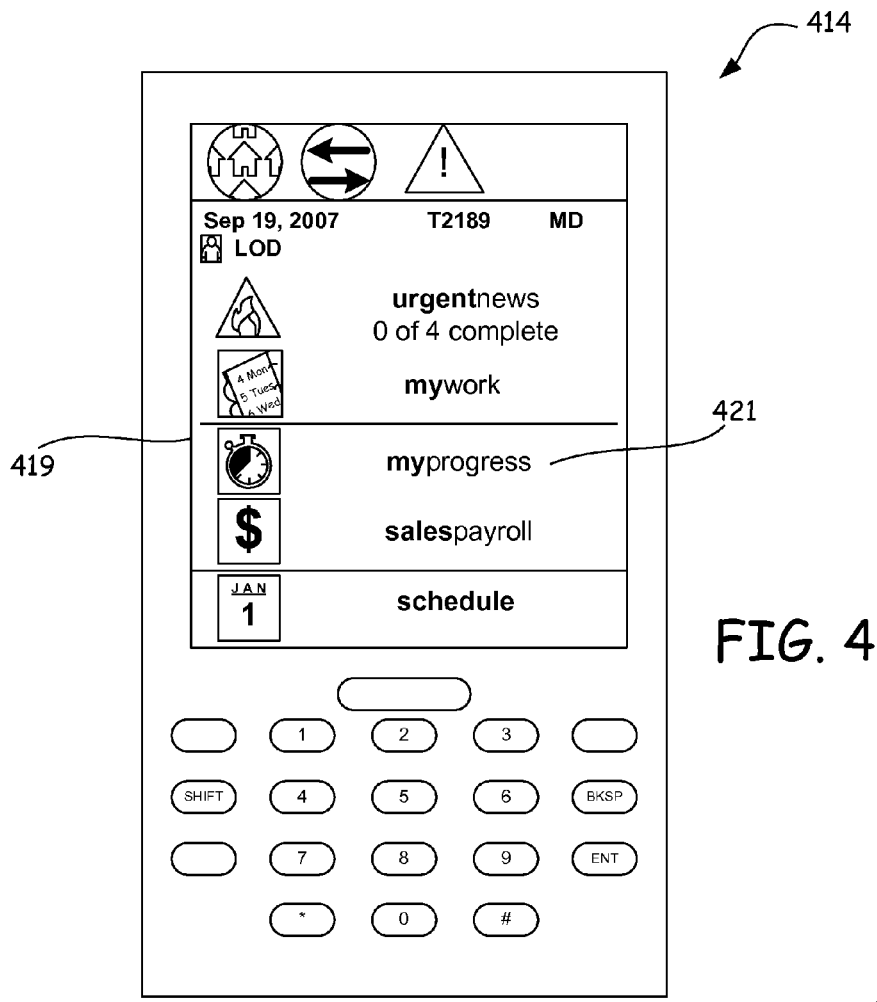
FIG. 4 is an exemplary embodiment of a client device including a display for use in a performance reporting system.
Figures 5, 6:
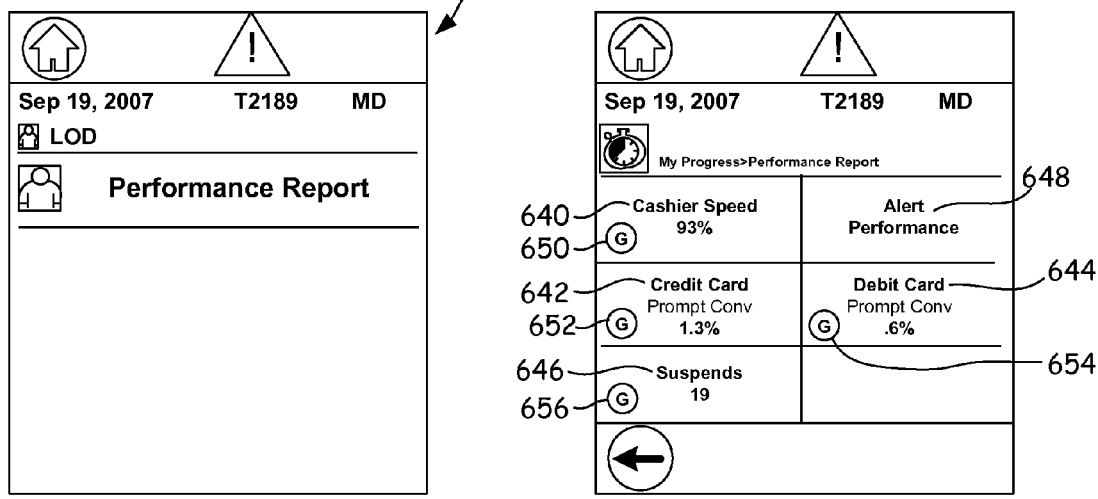
FIG. 5 is a screenshot illustrating an exemplary progress page.
FIG. 6 is a screenshot illustrating an exemplary summary performance report.

FIG. 3 is a flow diagram 300 illustrating a method of using performance report system 200 to render summary performance reports to employees or users of a client device 214. At block 302, performance reporting service 226 receives a request to render a summary performance report on a client device 214. FIG. 4 is an exemplary embodiment of a client device 414 including a display 419 for use in performance reporting system 200. Device 414 can be a handheld or mobile device and display 419 includes a screen on which a user is capable of selecting one of a plurality of options with a stylus, finger touch, keypad, etc. To request the rendering of a real-time performance report, a user selects the 'myprogress' item 421. FIG. 5 is a screenshot 500 illustrating an exemplary 'myprogress' page. The exemplary 'myprogress' page is for a user having a role that manages cashiers in a certain business area of a store. On the exemplary screenshot, the user selects 'performance report' item to request, in real-time, an on-demand summary performance report for their shift.

This request is fed to performance reporting service 226 through headquarters application 228 also located on headquarters server 236. Headquarters application 228 keeps track of which requests were made by which client devices 214 such that performance reports are sent to the appropriate client device that matches a request. Attached to the request for a performance report includes the user profile data packet of information. The user profile data packet is discussed above and includes information for performance reporting service 226 to retrieve shift information or parameters from a sign-on profile history service 232 as described in step 304. Sign-on history service 232 accesses user log-in database 231 to look up shift information. Such information includes the user's role and business area or areas the user is covering or has covered during their shift. Shift information, indicative of business area, is the type of information that business statistic providers can use to determine the performance of specific employees the user is managing and specific employee performance to performance report service 226.

At block 306, performance reporting service 226 obtains at least one summarized performance metric from one of a plurality of business data statistics providers 204, 206 and 208 using the shift information. As previously discussed, performance metrics can be formulated from POS transaction data, financial system data and tasks data that employees have been alerted to. It should be realized that other sources of data can be statistically evaluated and aggregated to also provide performance metrics.

Providers, such as provider 204, 206 and 208, can provide performance metrics regarding individual-type metrics of the user or employee or performance metrics of employees the user or employee is managing. In one example, performance reporting service 226 sends shift information (as discussed above) to POS transaction statistics provider 204 to obtain at least one summarized performance metric. In return, provider 204 sends at least one summarized performance metric. The at least one summarized performance metric can include an average of a performance statistic from a statistics provider. Such an average can be determined across all employees in the business area managed by the user.

In particular, the summarized performance metric can be a summarized cashier speed metric related to all cashiers that the employee is managing in their particular business area for their particular shift. This is an example of a performance metric related to employees the user is managing. In another example, performance reporting service 226 sends shift information to credit/debit conversion statistics provider 206 to obtain at least one summarized performance metric. In particular, the performance metric can be a summarized credit/debit conversion metric related to the conversion of a prompt given to a cashier to an application for, issuance of or opening and/or tendering of purchases from store credit or debit account. This is an example of a performance metric related to employees the user is managing. In yet another example, performance reporting service 226 sends shift information to alert statistics provider 208 to obtain at least one summarized performance metric. In return, provider 208 sends at least one summarized performance metric. In particular, the performance metric can be a summarized task metric related to tasks the user has been alerted to. This is an example of an individual-type performance metric.

At block 308, performance reporting service 226 sends the obtained summarized performance metric to scoring rules 202 to be scored. Scoring rules 202 compares the summarized performance metric to threshold values and assigns the performance metric a score based on which threshold values the metric exceeds. In particular, scoring rules 202 assigns the performance metric a first score if the performance metric has a value that is less than a first threshold value. Scoring rules 202 assigns the performance metric a second score if the performance metric is less than a second threshold value, but greater than the first threshold value. Scoring rules 202 assigns the performance metric a third score if the performance metric is at least as great as the second threshold value. Each of the first, second and third scores can be assigned a different color. For example, a first score can be represented by the color red which represents a less than acceptable performance, a second score can be represented by the color yellow which represents mediocre performance and a third score can be represented by the color green which represents good performance. For example, when the performance metric is a summarized conversion metric related to the conversion of a prompt given to a cashier to an application for, issuance of or opening and/or tendering of purchases from store credit or debit account, the metric can be expressed in terms of a percentage of converted prompts to applications. For this metric, a first threshold value can be 0.9 and a second threshold value can be 1.3. Therefore, if the percentage of converted prompts to applications of all cashiers an employee is managing is 1.3%, then the score, given this summarized performance metric, is green in color.

At block 310, performance reporting service 226 compiles the at least one summarized performance metric and any corresponding score associated with the at least one summarized performance metric into the summary performance report. At block 312, performance reporting service 226 sends the summary performance report to headquarters application 228, which sends it to the appropriate client device 214 for rendering.

FIG. 6 is a screenshot 600 illustrating an exemplary summary performance report as rendered on a client device. The screenshot 600 includes a plurality of rendered performance categories having summarized performance report metrics including a cashier speed performance metric 640, a credit conversion metric 642, a debit conversion metric 644 and a transaction suspend and retrieve metric 646. Alert performance category 648 is also rendered. Although the alert performance 648 is not assigned a summarized performance metric in the embodiment illustrated in FIG. 6, in other embodiments the alert performance 648 could be assigned a summarized performance metric. Likewise, although cashier speed performance metric 640, credit conversion metric 642, debit conversion metric 644 and transactions suspend and retrieve metric 646 are assigned summarized performance metrics in the embodiment illustrated in FIG. 6, in other embodiments these report metrics do not necessarily have to have an assigned summarized performance metric. It may be that there is interest in some performance metrics that are summarized while interest in other performance metrics may be only in detailed metrics. Even if summarized metrics are not available for specific categories of performance, the performance category still appears in the summarized report such that it is accessible for finding detailed metrics.

Each of the performance categories on the summary performance report that has summarized performance metrics, such as metrics 640, 642, 644 and 646, can also include a score 650, 652, 654 and 656 rendered with the summarized performance metric. Scores 650, 652, 654 and 656 are rendered in terms of color associated with a first, second and third score. As illustrated in FIG. 6, each of summarized performance metrics 640, 642, 644 and 646 include green color or third scores. Such a green score is indicative of good performance.

Figure 7:
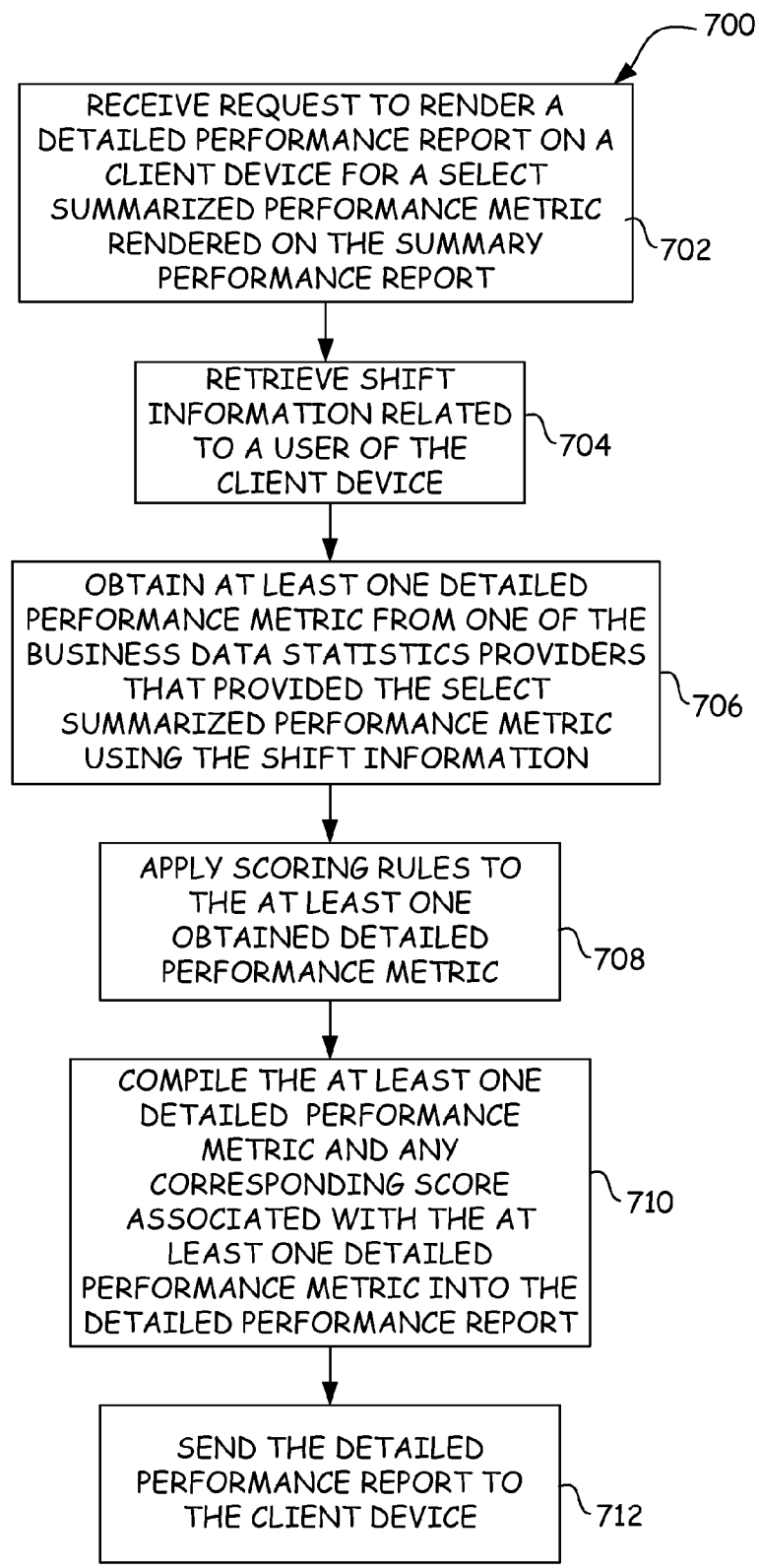
FIG. 7 is a flow diagram illustrating a method of using the performance reporting system illustrated in FIG. 2 to render a detailed performance report.

A user can select any of the areas on the screen denoting any of the rendered performance categories, which might have corresponding metrics and scores to learn drill down or detailed performance information related to that particular performance category. FIG. 7 is a flow diagram 700 illustrating a method of using performance report system 200 to render a detailed performance report to employees or users of a client device 214. At block 702, upon a user selecting one of the summarized performance categories, performance reporting service 226 receives a request to render a detailed performance report on a client device 214 for the selected performance category on the summarized performance report.

This request is fed to performance reporting service 226 through headquarters application 228. As with rendering a summary performance report, attached to the request for a detailed performance report includes the user profile data packet of information of the client device. At block 704, performance reporting service 226 retrieves shift information from sign-on history service 232. Sign-on history service 232 accesses user log-in database 231 to look up shift information for the user of the client device. Such information can include which business area or areas the user is covering or has covered during their shift.

At block 706, performance reporting service 226 obtains at least one detailed performance metric from the business data statistics provider that provided the selected summarized performance metric using the shift information. In the case of a provider that provides performance metrics regarding individual-type metrics of the user or employee, at least one detailed performance metric can be obtained related to the user. In the case of a provider that provides performance metrics of employees the user or employee is managing, at least one detailed performance metric can be obtained related to at least one of the employees the user is managing. By passing the shift information, the provider can send information regarding employees the user is in charge of during the user's particular shift.

At block 708, performance reporting service 226 sends the at least one obtained detailed performance metric to scoring rules 202 to be scored. Scoring rules 202 compares each detailed performance metric to threshold values and assigns the performance metric a score based on the threshold value. Such thresholds and scores are discussed above in accordance with the method illustrated in FIG. 3.

At block 710, performance reporting service 226 compiles the at least one detailed performance metric and any corresponding score associated with the at least one detailed performance metric into the detailed performance report. At block 712, performance reporting service 226 sends the detailed performance report to headquarters application 228, which sends it to the appropriate client device 214 for rendering.

FIG. 8 is a screenshot 800 illustrating an exemplary detailed performance report for the cashier speed summarized performance metric 640 illustrated in FIG. 6 as rendered on a client device. The screenshot 800 includes a plurality of rendered detailed performance metrics and corresponding scores for each employee the user is managing. First, third and fifth detailed performance metrics 860, 862 and 864 of cashier speed correspond with a third or green score, which, in accordance with the description above, are indicative of good performance. Second and fourth detailed performance metrics 866 and 868 of cashier speed correspond with a second or yellow score, which, in accordance with the description above, are indicative of mediocre performance.

FIG. 9 is a screenshot 900 illustrating an exemplary detailed performance report for the alert performance category 648 illustrated in FIG. 6 as rendered on a client device. The screenshot 900 includes a plurality of rendered detailed performance metrics and corresponding scores for each type of alerted-to task the user is responsible for. For example, first detailed performance metric 960 includes average response times to alerts having a high priority type, second detailed performance metric 962 includes average response times to alerts having medium priority and third detailed performance metric 964 includes average response times to alerts having a low priority. In FIG. 9, each detailed performance metric (i.e., average response time) includes a corresponding score. The alert type and number of alerts within the alert type categorize the particular detailed performance metrics. First and second detailed performance metrics 960 and 962 of average response time correspond with a third or green score, which, in accordance with the description above, is indicative of good performance. Third detailed performance metric 964 of average response time corresponds with a second or yellow score, which, in accordance with the description above, is indicative of mediocre performance. The fourth and fifth detailed performance metrics 966 and 968 of average response time have not been scored.

FIG. 10 is a screenshot 1000 illustrating an exemplary detailed performance report for the credit conversion summarized performance metric 642 illustrated in FIG. 6 as rendered on a client device. The screenshot 1000 includes a plurality of rendered detailed performance metrics and corresponding scores for each employee the user is managing. First and third detailed performance metrics 1060 and 1062 of credit conversion correspond with a third or green score, which, in accordance with the description above, is indicative of good performance. Second detailed performance metric 1064 of credit conversion correspond with a second or yellow score, which, in accordance with the description above, is indicative of mediocre performance. Fourth detailed performance metric 1066 of credit conversion corresponds with a first or red score, which, in accordance with the description above, is indicative of inadequate performance.

FIG. 11 is a screenshot 1100 illustrating an exemplary detailed performance report for the debit conversion summarized performance metric 644 illustrated in FIG. 6 as rendered on a client device. The screenshot 1100 includes a plurality of rendered detailed performance metrics and corresponding scores for each employee the user is managing. First and third detailed performance metrics 1160 and 1162 of debit conversion correspond with a third or green score, which, in accordance with the description above, is indicative of good performance. Second detailed performance metric 1164 of credit conversion correspond with a second or yellow score, which, in accordance with the description above, is indicative of mediocre performance. Fourth detailed performance metric 1166 of debit conversion corresponds with a first or red score, which, in accordance with the description above, is indicative of inadequate performance.

FIG. 12 is a screenshot 1200 illustrating an exemplary detailed performance report for suspended/retrieved summarized performance metric 646 illustrated in FIG. 6 as rendered on a client device. The screenshot 1200 includes a plurality of rendered detailed performance metrics and corresponding scores for each employee the user is managing. First, third and fifth detailed performance metrics 1260, 1262 and 1264 of suspended/retrieved rates correspond with a third or green score, which, in accordance with the description above, is indicative of good performance. Second detailed performance metric 1266 of suspended/retrieved rate corresponds with a second or yellow score, which, in accordance with the description above, is indicative of mediocre performance. Fourth detailed performance metric 1268 of suspended/retrieved rate corresponds with a first or red score, which, in accordance with the description above, is indicative of inadequate performance.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving a request to render a summary performance report on a client device in a retail establishment;
   a processor retrieving shift information related to a user of the client device using the user's client device log-in information, the shift information indicating a business area the user of the client device is managing, wherein the business area of the retail establishment includes a plurality of point-of-sale registers;
   obtaining at least one summarized performance metric from one of a plurality of business data statistics providers using the shift information, wherein the at least one summarized performance metric comprises an average of a performance statistic wherein the average that is determined across all employees and all of the point-of-sale registers in the business area managed by the user;
   applying scoring rules to the at least one obtained summarized performance metric;
   compiling the at least one summarized performance metric and any corresponding score associated with the at least one summarized performance metric into the summary performance report; and
   sending the summary performance report to the client device for rendering,
   wherein the business data statistics provider comprises a point-of-sale transactions statistics provider configured to statistically aggregate transaction data from the point-of-sale registers to thereby provide summarized performance metrics related to point-of-sale transactions, wherein one of the summarized performance metrics related to the point-of-sale transactions comprises an average cashier speed metric, and wherein the business data statistics provider comprises a credit/debit conversions statistics provider configured to statistically aggregate financial data related to credit/debit conversions to thereby provide an average credit/debit conversion metric, the credit/debit conversion metric relating to a rate of conversions of a prompt from the point-of-sale registers to one of an application for, issuance of, or opening of a store credit or debit account.

2. The method of claim 1, wherein the shift information is indicative of a duration of time a user is logged into a particular user role thereby connecting the
   user logged into the user role with activity under the particular user role's responsibility.

3. The method of claim 1, wherein the business data statistics provider comprises an alert statistics provider configured to statistically aggregate data related to alerted tasks to thereby provide task completion metrics.

4. The method of claim 1, further comprising: receiving a request to render a detailed performance report on the client device for a select summarized performance metric rendered on the summary performance report; retrieving shift information related to the user of the client device using the user's client device log-in information; obtaining at least one detailed performance metric from the business data statistics provider that provided the select summarized performance metric using the shift information, the at least one detailed performance metric comprising a separate value for each employee managed by the user; applying scoring rules to the at least one detailed performance metric; compiling the at least one detailed performance metric and any corresponding score associated with the at least one detailed performance metric into the detailed performance report; and sending the detailed performance report to the client device.

5. The method of claim 4, wherein the business data statistics provider comprises a point-of-sale transactions statistics provider configured to statistically aggregate transaction data from point-of-sale registers to thereby provide summarized performance metrics related to point-of-sale transactions, wherein the separate value for each employee comprises a cashier speed metric.

6. The method of claim 4, wherein the business data statistics provider comprises a credit/debit conversions statistics provider configured to statistically aggregate financial data related to credit/debit conversions, wherein the separate value for each employee
   comprises a credit/debit conversion metric.

7. A method comprising:
   receiving a request to render a summary performance report on a client device in a retail establishment;
   retrieving shift information related to a user of the client device;

a processor obtaining at least one summarized performance metric from a statistics provider configured to statistically aggregate point-of-sale transaction data from a plurality of point-of-sale registers using the shift information, the plurality of point-of-sale registers including all point-of-sale registers in one or more selected or assigned business areas managed by the user, wherein the statistics provider comprises a point-of-sale transactions statistics provider configured to statistically aggregate transaction data from the point-of-sale registers to thereby provide summarized performance metrics related to point-of-sale transactions, wherein one of the summarized performance metrics related to the point-of-sale transactions comprises an average cashier speed metric, and wherein the statistics provider comprises a credit/debit conversions statistics provider configured to statistically aggregate financial data related to credit/debit conversions to thereby provide an average credit/debit conversion metric, the credit/debit conversion metric relating to a rate of conversions of a prompt from the point-of-sale registers to one of an application for, issuance of, or opening of a store credit or debit account;

applying scoring rules to the at least one obtained summarized performance metric to produce a score; and sending the summary performance report to the client device, the summary performance report including the at least one summarized performance metric and a score associated with the at least one summarized performance metric.

8. The method of claim 7, wherein the summarized performance metric comprises a summation of suspended and retrieved transactions.

9. The method of claim 7, further comprising:

receiving a request to render a detailed performance report on the client device for a select summarized performance metric rendered on the summary performance report; retrieving the shift information related to the user of the client device;

obtaining at least one detailed performance metric from the statistics provider that provided the select summarized performance metric using the shift information;

applying scoring rules to the at least one detailed performance metric to produce a score; compiling the at least one detailed performance metric and corresponding score associated with the at least one detailed performance metric into the detailed performance report; and sending the detailed performance report to the client device.

* * * * *